United States Patent
Dedrich

(10) Patent No.: US 9,112,444 B2
(45) Date of Patent: Aug. 18, 2015

(54) ELECTRIC MACHINE INCLUDING A TEMPERATURE SENSING SYSTEM

(71) Applicant: REMY TECHNOLOGIES, L.L.C., Pendleton, IN (US)

(72) Inventor: Paul Martin Dedrich, Auburn, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 338 days.

(21) Appl. No.: 13/803,198

(22) Filed: Mar. 14, 2013

(65) Prior Publication Data

US 2014/0265656 A1 Sep. 18, 2014

(51) Int. Cl.
*H02K 11/00* (2006.01)
*H02P 29/00* (2006.01)

(52) U.S. Cl.
CPC ........ *H02P 29/0055* (2013.01); *H02K 11/0047* (2013.01)

(58) Field of Classification Search
USPC ......... 310/53, 68 C, 68 R, 68 D, 71; 318/471, 318/473
See application file for complete search history.

(56) References Cited

U.S. PATENT DOCUMENTS

| | | | |
|---|---|---|---|
| 8,766,562 B2* | 7/2014 | Schaefer et al. | 318/12 |
| 8,829,840 B2* | 9/2014 | Andarawis et al. | 318/490 |
| 2005/0218731 A1* | 10/2005 | Ryan et al. | 310/68 C |
| 2006/0066155 A1* | 3/2006 | Matin et al. | 310/52 |
| 2009/0108785 A1* | 4/2009 | Takada | 318/400.38 |
| 2010/0231155 A1* | 9/2010 | Schmidt et al. | 318/473 |
| 2010/0270798 A1* | 10/2010 | Poulsen et al. | 290/44 |
| 2011/0295558 A1* | 12/2011 | Fish et al. | 702/184 |
| 2012/0206850 A1* | 8/2012 | Takeuchi et al. | 361/153 |

* cited by examiner

*Primary Examiner* — Thanh Lam
(74) *Attorney, Agent, or Firm* — Cantor Colburn LLP

(57) ABSTRACT

An electric machine includes a housing, a stator including stator windings mounted to the housing, a rotor supported in the housing and configured to rotate relative to the stator, a temperature sensing system including one or more resistors mounted to one of the stator and the rotor, and a controller electrically connected to the one or more resistors. The controller is configured and disposed to determine a temperature of the one of the stator and the rotor based on an electrical parameter of the one or more resistors.

20 Claims, 2 Drawing Sheets

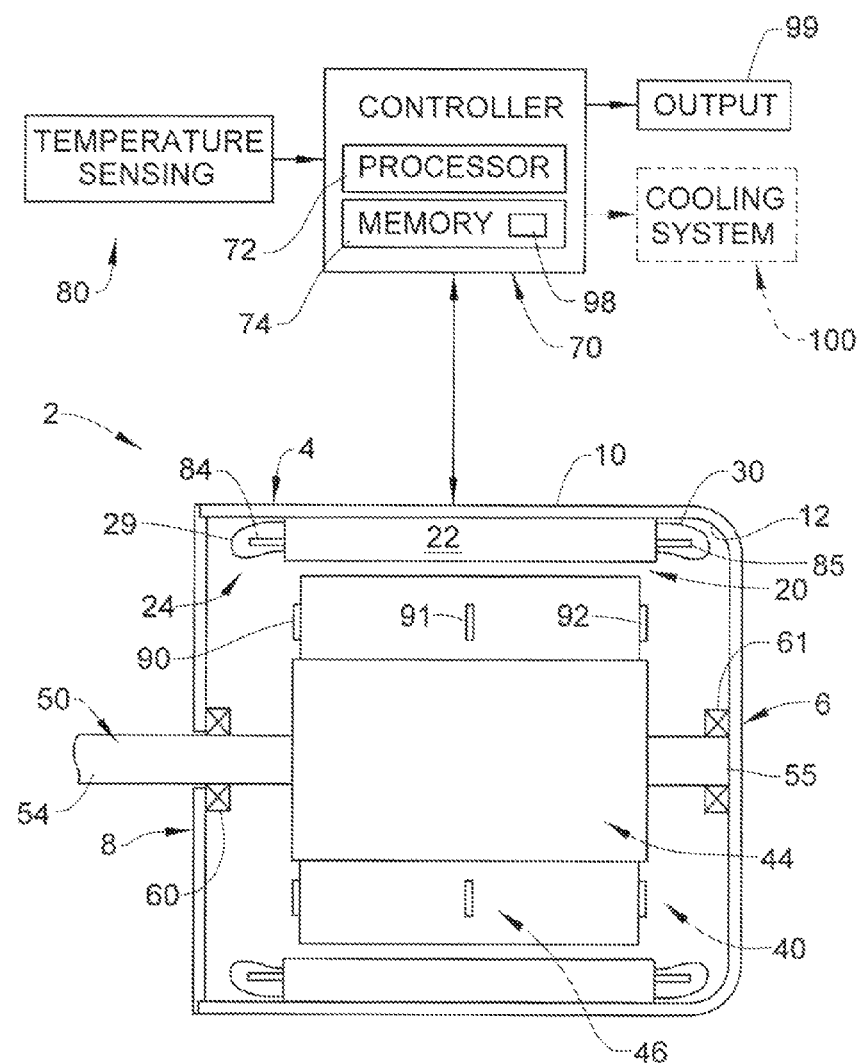

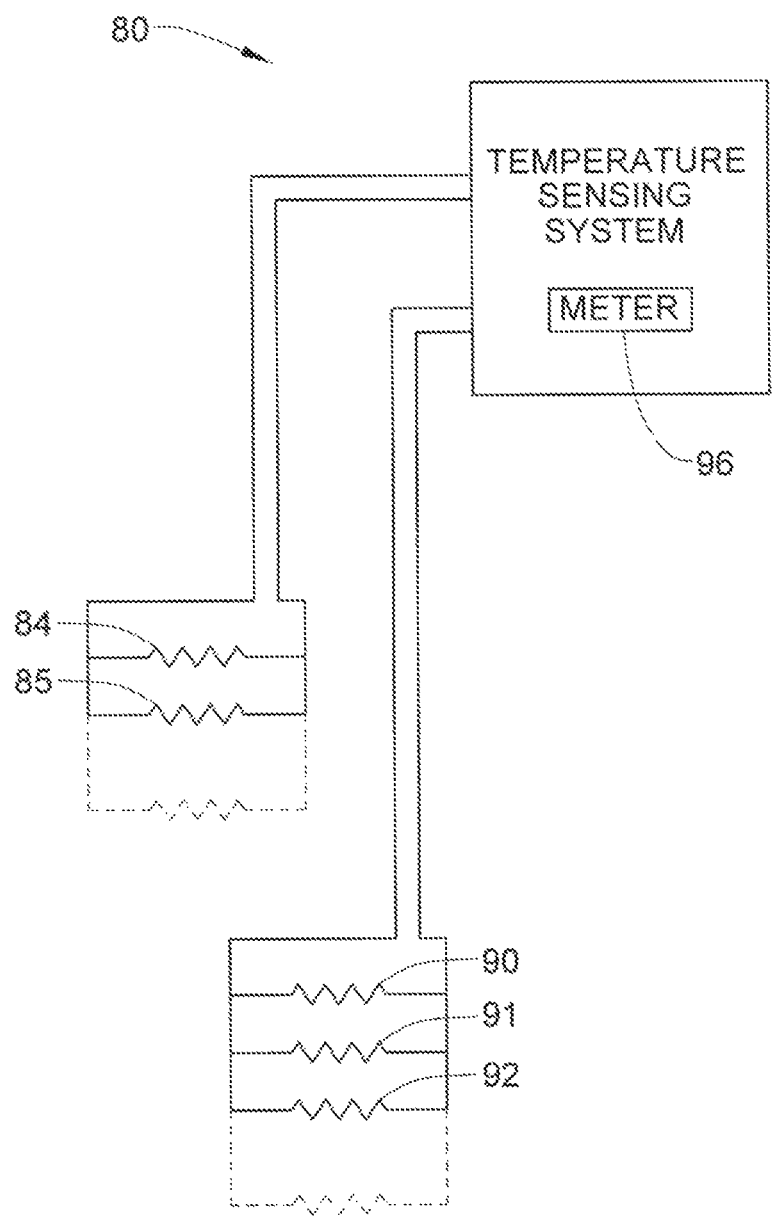

ELECTRIC MACHINE INCLUDING A TEMPERATURE SENSING SYSTEM

BACKGROUND OF THE INVENTION

Exemplary embodiments pertain to the art of electric machines and, more particularly, to an electric machine including a temperature sensing system.

Electric machines typically include a stationary member, or stator, that establishes a stationary field, and a rotating member, or rotor, that moves within the stationary field. In operation, electric machines produce work from electrical energy passing through a stator to induce an electro-motive force in the rotor. The electro-motive force creates a rotational force at the rotor. The rotation of the rotor is used to power various external devices. Of course, electric machines can also be employed to produce electricity from a work input. In either case, electric machines are currently producing greater outputs at higher speeds and are being designed in smaller packages. The electrical energy flowing through the stator and the rotor creates heat. It is desirable to remove the heat from the electric machine to enhance operating efficiency.

BRIEF DESCRIPTION OF THE INVENTION

Disclosed is an electric machine including a housing, a stator including stator windings mounted to the housing, a rotor supported in the housing and configured to rotate relative to the stator, a temperature sensing system including one or more resistors mounted to one of the stator and the rotor, and a controller electrically connected to the one or more resistors. The controller is configured and disposed to determine a temperature of the one of the stator and the rotor based on an electrical parameter of the one or more resistors.

Also disclosed is a method of operating an electric machine. The method includes sensing an electrical parameter of at least one resistor mounted to one of a stator and a rotor of the electric machine, determining a temperature of the one of the stator and the rotor based on the electrical parameter, and adjusting an operating parameter of the electric machine based on the temperature.

BRIEF DESCRIPTION OF THE DRAWINGS

The following descriptions should not be considered limiting in any way. With reference to the accompanying drawings, like elements are numbered alike:

FIG. 1 depicts an electric machine including a temperature sensing system in accordance with an exemplary embodiment; and FIG. 2 depicts a block diagram illustrating the temperature sensing system of FIG. 1.

DETAILED DESCRIPTION OF THE INVENTION

A detailed description of one or more embodiments of the disclosed apparatus and method are presented herein by way of exemplification and not limitation with reference to the Figures.

An electric machine in accordance with an exemplary embodiment is indicated generally at 2. Electric machine 2 includes a housing 4 having an end wall 6 and a cover 8. Housing 4 includes an outer surface 10 and an inner surface 12. A stator 20 is fixedly mounted relative to inner surface 12. Stator 20 includes a stator core 22 and a plurality of stator windings 24. Plurality of stator windings 24 is supported by stator core 22 and includes a first end turn portion 29 and a second end turn portion 30. A rotor 40 is arranged within housing 4 and rotatably supported relative to stator 20.

Rotor 40 includes a rotor body 44 that supports a plurality of rotor laminations 46. It should be understood, that rotor body 44 could also support rotor windings. Rotor body 44 is supported in housing 4 by a shaft 50. Shaft 50 extends from a first end 54 to a second end 55. First end 54 is supported at cover 8 by a first bearing 60 and second end 55 is supported at end wall 6 by a second bearing 61. Electric machine 2 is electrically connected to a controller 70 having a processor 72 and a memory 74. Controller 70 selectively establishes various operating parameters of electric machine 2 based on user inputs and/or instructions received from other external inputs (not shown). Controller 70 also receives inputs from a temperature sensing system 80.

In accordance with an exemplary embodiment, temperature sensing system 80 includes a plurality of resistors, two of which are indicated at 84 and 85, provided at stator 20. In the exemplary embodiment shown, resistors 84 and 85 are shown mounted to respective ones of first and second end turn portions 29 and 30. It should however be understood that one or more resistors could also be provided at stator core 22. Temperature sensing system 80 also includes a plurality of resistors, three of which are indicated at 90, 91 and 92 provided at rotor 40. In the exemplary embodiment shown, resistors 90 and 92 are arranged on an outer surface (not separately labeled) or rotor laminations 46, and resistor 91 is arranged within rotor laminations 46. It should be understood that the number and location of resistors 90, 91 and 92 could vary. Further it should be understood that one or more resistors could also be provided at rotor body 44. It should also be understood that the term resistor means a passive two terminal electrical component that implements electrical resistance. The term "resistor" should not be understood to include thermocouples, or resistance temperature detectors and the like.

As shown in FIG. 2, resistors 84 and 85 are connected in parallel with temperature sensing system 80. Likewise, resistors 90, 91 and 92 are connected in parallel with temperature sensing system 80. In accordance with an aspect of the exemplary embodiment, temperature sensing system 80 measures an electrical parameter of resistors 84, 85 and 90-92. In accordance with another aspect of the exemplary embodiment, the electrical parameter includes a first voltage drop across resistors 84, 85 and a second voltage drop across resistors 90, 91 and 92. The first and second voltage drops are sensed by a voltage meter 96 provided in temperature sensing system 80. Voltage meter 96 passes the first and second voltage drops to controller 70 for storage in memory 74. Processor 72 monitors for changes in the first and second voltage drops to determine temperatures in stator 20 and rotor 40.

In accordance with an exemplary embodiment, processor 72 calculates changes in resistance of resistors 84, 85 and resistors 90, 91, and 92 based on changes in the first and second voltage drops, respectively. The changes in resistance are compared against values provided in a look-up table 98 stored in memory 74 to determine changes in temperature at stator 20 and rotor 40. Controller 70 may adjust operating parameters of electric machine 2 based on changes in temperature. Controller 70 may also provide an output 99 alerting operators that a change in operating parameters of electric machine 2 may be needed. Further, controller 70 may adjust operating parameters of a cooling system 100 associated with electric machine 2. More specifically, controller 70 may increase cooling as temperatures in stator 20 and/or rotor 40 increase, and decrease cooling when temperatures in stator 20 and/or rotor 40 decrease.

At this point it should be understood that the exemplary embodiments employ resistors mounted in various portions of an electric machine for temperature sensing. In contrast to prior systems that employ bulky sensors such as RTD, thermocouples and the like, the present invention employs resistors that are smaller in size than prior art arrangements and may be more robust. In this manner, the temperature sensing system is readily incorporated into electric machines having a relatively small footprint. In addition, it should be appreciated that the number, and placement of resistors may vary. Further, resistors may be mounted only in the stator or only in the rotor depending upon design considerations of the electric machine.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
   a housing;
   a stator including stator windings mounted to the housing;
   a rotor supported in the housing and configured to rotate relative to the stator; and
   a temperature sensing system including one or more resistors mounted to one of the stator and the rotor; and
   a controller electrically connected to the one or more resistors, the controller being configured and disposed to determine a temperature of the one of the stator and the rotor based on an electrical parameter of the one or more resistors.

2. The electric machine according to claim 1, wherein the one or more resistors comprise a plurality of resistors positioned at the stator windings.

3. The electric machine according to claim 2, wherein each of the plurality of resistors is connected in parallel to the controller.

4. The electric machine according to claim 1, wherein the one or more resistors comprise a plurality of resistors positioned at the rotor.

5. The electric machine according to claim 4, wherein each of the plurality of resistors is connected in parallel to the controller.

6. The electric machine according to claim 4, wherein the rotor includes a plurality of laminations, at least one of the plurality of resistors being mounted to one or more of the plurality of laminations.

7. The electric machine according to claim 1, wherein the one or more resistors includes at least one resistor positioned at the stator windings and at least one resistor positioned at the rotor.

8. The electric machine according to claim 7, wherein the at least one resistor positioned at the stator windings includes a plurality of resistors mounted to the stator windings, and the at least one resistor positioned at the rotor includes a plurality of resistors mounted to rotor laminations.

9. The electric machine according to claim 8, wherein each of the plurality of resistors mounted to the stator is electrically connected in parallel to the controller, and each of the plurality of resistors mounted to the rotor is electrically connected in parallel to the controller.

10. The electric machine according to claim 1, wherein the controller includes a voltage meter configured and disposed to measure a voltage drop across the at least one resistor.

11. The electric machine according to claim 10, wherein the electrical parameter comprises electrical resistance, the controller being configured and disposed to determine a change in resistance of the at least one resistor based on a change in the voltage drop.

12. The electric machine according to claim 11, wherein the controller includes a look-up table including temperature values correlated to the change in resistance of the at least one resistor.

13. The electric machine according to claim 11, wherein the controller is configured and disposed to adjust operation of the electric machine based on the change in resistance of the at least one resistor.

14. The electric machine according to claim 11, further comprising: a cooling system, the controller being configured and disposed to adjust the cooling system based on the change in resistance of the at least one resistor.

15. A method of operating an electric machine, the method comprising:
   sensing an electrical parameter of at least one resistor mounted at one of a stator and a rotor of the electric machine;
   determining a temperature of the one of the stator and the rotor based on the electrical parameter; and
   adjusting an operating parameter of the electric machine based on the temperature.

16. The method of claim 15, wherein sensing the electrical parameter of the at least one resistor includes sensing the electrical parameter of a plurality of resistors mounted at the one of the stator and the rotor.

17. The method of claim 15, wherein sensing the electrical parameter of the at least one resistor includes sensing the electrical parameter of a plurality of resistors mounted at each of the stator and the rotor.

18. The method of claim 15, wherein determining a temperature of the one of the stator and the rotor includes correlating a change in resistance of the at least one resistor with a temperature value stored in a look-up table.

19. The method of claim 15, wherein adjusting an operating parameter of the electric machine includes changing an output speed of the electric machine.

20. The method of claim 15, wherein adjusting an operating parameter of the electric machine includes adjusting a flow of coolant through the electric machine.

* * * * *